United States Patent
Gala

(10) Patent No.: US 8,754,895 B2
(45) Date of Patent: Jun. 17, 2014

(54) PIPELINED IMAGE PROCESSING ENGINE

(75) Inventor: Heman K. Gala, Schaumburg, IL (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 1011 days.

(21) Appl. No.: 12/457,858

(22) Filed: Jun. 24, 2009

(65) Prior Publication Data

US 2010/0060651 A1 Mar. 11, 2010

Related U.S. Application Data

(60) Provisional application No. 61/191,557, filed on Sep. 9, 2008.

(51) Int. Cl.
G06T 1/20 (2006.01)
G06F 15/80 (2006.01)
G06T 15/00 (2011.01)
G06F 9/38 (2006.01)

(52) U.S. Cl.
CPC ............... *G06T 15/005* (2013.01); *G06F 9/38* (2013.01); *G06T 1/20* (2013.01)
USPC ............ 345/506; 345/501; 345/502; 345/503

(58) Field of Classification Search
CPC ............ G06T 15/005; G06T 1/20; G06F 9/38
USPC .......... 345/501, 502, 503, 506; 382/254–275; 715/723, 726
See application file for complete search history.

(56) References Cited

U.S. PATENT DOCUMENTS

| | | | |
|---|---|---|---|
| 6,823,087 B1* | 11/2004 | Liu et al. | 382/266 |
| 6,867,782 B2* | 3/2005 | Gaudette et al. | 345/530 |
| 2008/0316216 A1* | 12/2008 | Bakalash et al. | 345/505 |
| 2009/0263041 A1* | 10/2009 | Lahman et al. | 382/261 |
| 2009/0324121 A1* | 12/2009 | Bhagavathy et al. | 382/260 |

FOREIGN PATENT DOCUMENTS

| | | |
|---|---|---|
| JP | 2000182036 A | 6/2000 |
| JP | 2000251065 A | 9/2000 |
| JP | 2002049603 A | 2/2002 |
| JP | 2003157243 A | 5/2003 |
| JP | 2007323335 A | 12/2007 |

OTHER PUBLICATIONS

Hyo-Sub Oh; Yoon Kim; You-Young Jung; Morales, A.W.; Sung-Jea Ko;, "Spatio-temporal edge-based median filtering for deinterlacing," Consumer Electronics, 2000. ICCE. 2000 Digest of Technical Papers. International Conference on, vol., No., pp. 52-53, 2000.*

(Continued)

*Primary Examiner* — David T Welch
(74) *Attorney, Agent, or Firm* — Haverstock & Owens LLP

(57) ABSTRACT

The present invention related to processing image frames through a pipeline of effects by breaking the image frames into multiple blocks of image data. The example method includes generating a plurality of blocks from each frame, processing each block through a pipeline of effects in a pre-defined consecutive order, and aggregating the processed blocks to produce an output frame by combining the primary pixels from each processed block. The pipeline of effects may be distributed over a plurality of processing nodes, and each effect may process a block, provided as input to the node. Each processing node may independently process a block using an effect.

24 Claims, 12 Drawing Sheets

(56) References Cited

OTHER PUBLICATIONS

Heman K. Gala, "Pipelined Image Processing Engine for Cell/B.E"., pp. 1-9, Sony Technical Symposium 2008.

Thomas M. Benson et al., 3D Filtered Backprojection for Curved Detector Axial Cone-Beam Data on a Playstationr _3, http//ieexployre.ieee.org/application/md/mdifilecabinetfull.jsp?ResultStart=0&arnumber=04436888, Pangea 3, 2009.

* cited by examiner

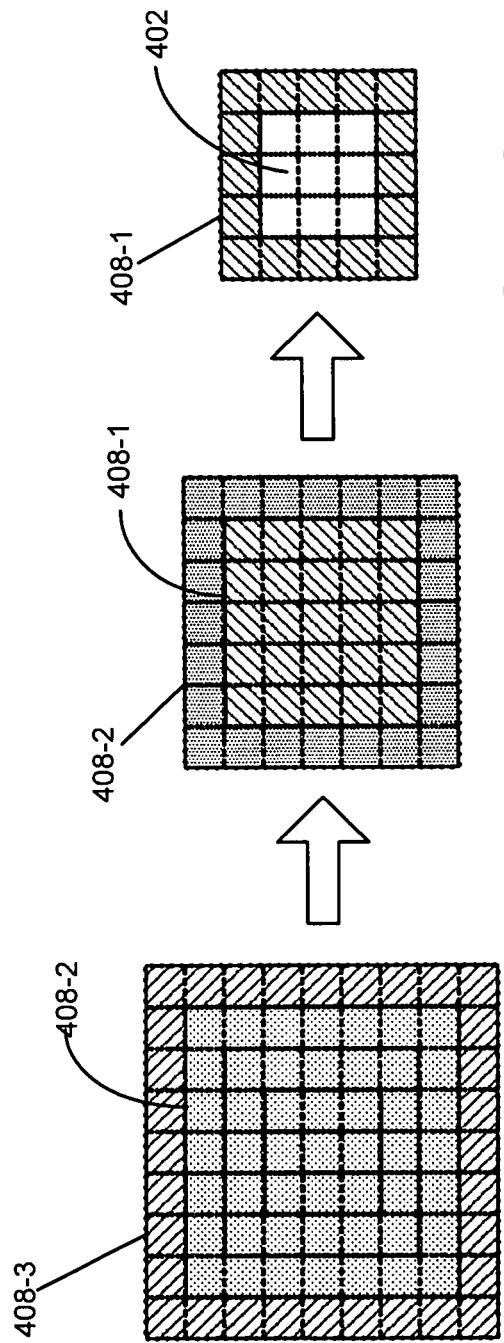
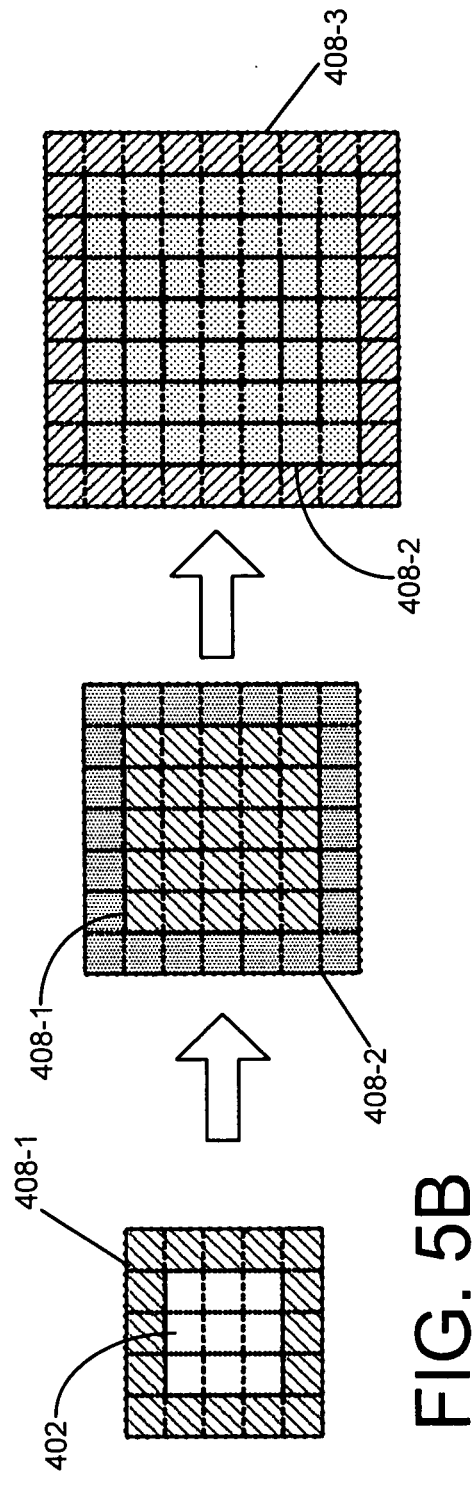
FIG. 5A
FIG. 5B

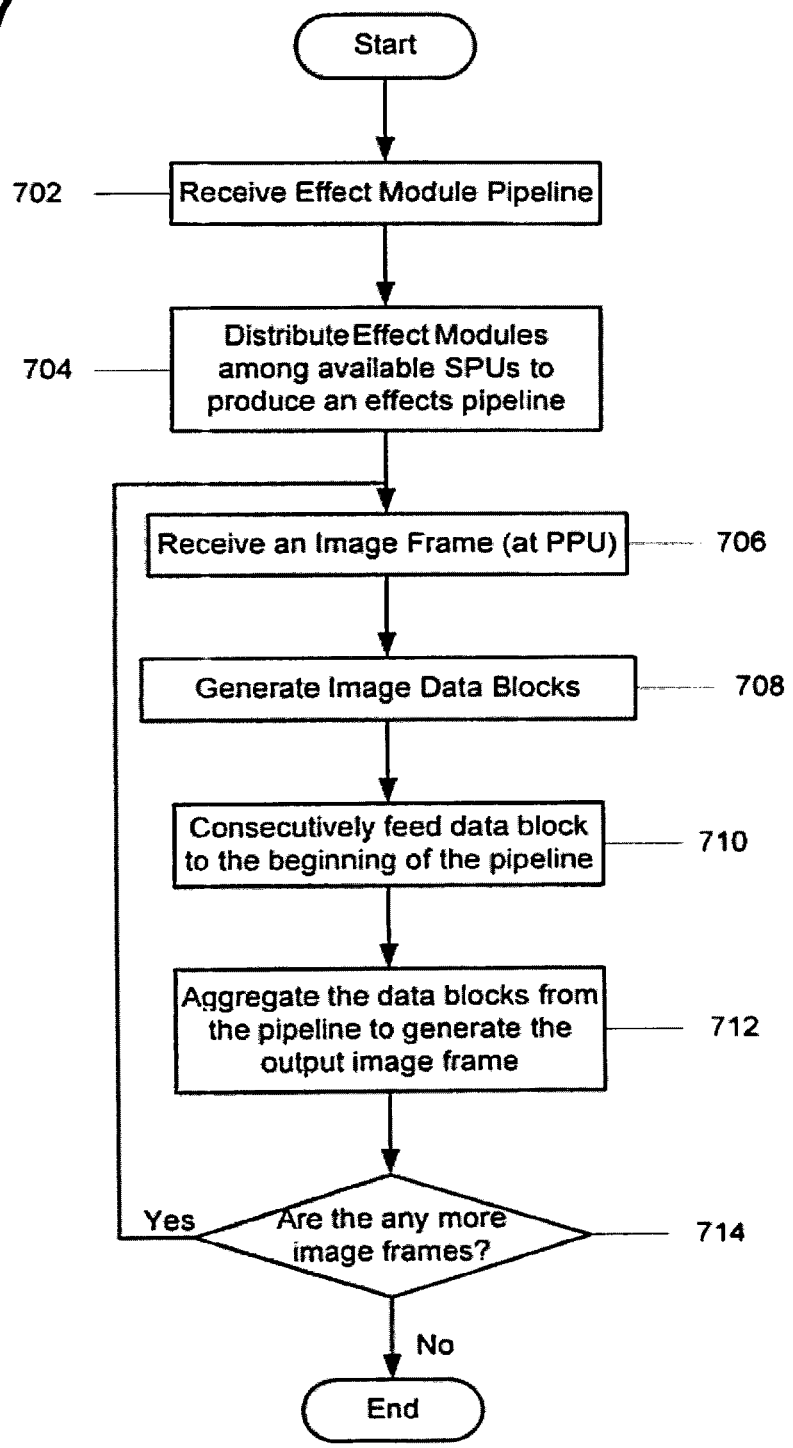

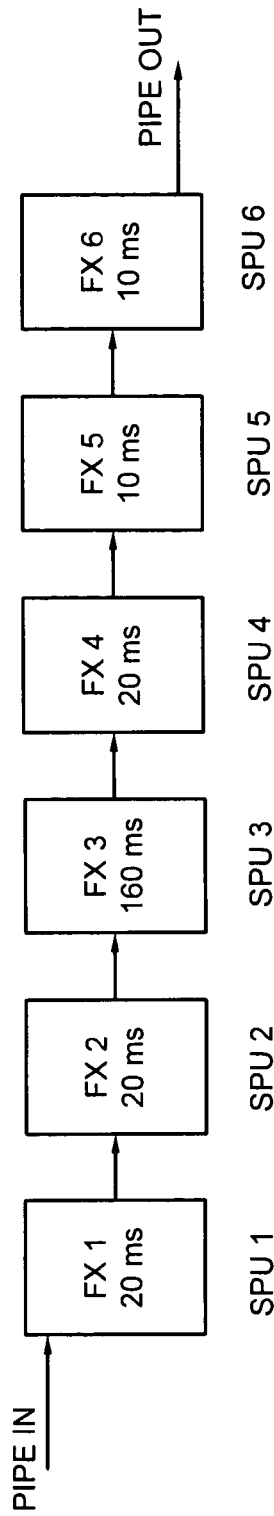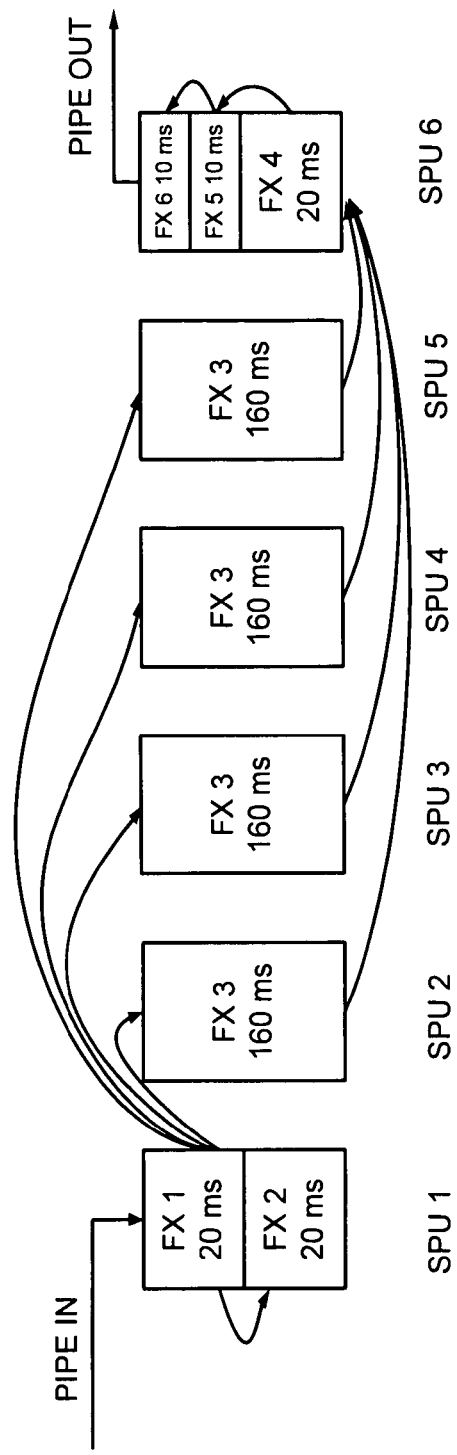
FIG. 10A
FIG. 10B

PIPELINED IMAGE PROCESSING ENGINE

CROSS REFERENCE TO RELATED APPLICATIONS

This application is related to U.S. Provisional Application Ser. No. 61/191,557 filed on Sep. 9, 2008 the entire contents of which are hereby incorporated by reference.

BACKGROUND OF THE INVENTION

1. Field of the Invention

This invention relates generally to a Pipelined Image Processing Engine and more particularly to a system and method for processing a plurality of image frames through an effect pipeline on a multi-core processing system.

2. Description of the Related Art

As manufacturing technology continues to improve, the physical limits of semiconductor-based microelectronics expand to meet the demand for more capable microprocessors. Limitations in processing speed have led to adaptations that leverage existing processor speeds and capabilities through parallelism by employing multi-core or distributed architectures to distribute workloads and thereby increase processing capacity and reduce processing time.

Applications in the film/video/imaging space often chain together multiple image processing effects in a pipelined fashion. These image processing pipelines can benefit from parallelism offered through multi-core or distributed architectures. Applications performing such image processing share common characteristics, including the need to both process and move vast amounts of data at real-time rates.

Conventional implementations of such systems suffer from a combination of problems, ranging from poor throughput, high latency, and increased complexity, which reduces extensibility and scalability. These limitations are compounded when chaining together multiple, discrete effects which depend on consecutive execution, as in a pipelined system.

When processing video, an 'effect pipeline' refers to the application of visual effects in a defined order to an image. Similarly, an 'effect' refers to each stage of the effect pipeline.

Prior approaches to distributing hardware resources among the various effects in effect pipelines generally suffer from a number of limitations with respect to parallelism.

One approach defines each image frame of data as the minimum quantum of work, allowing each effect to operate on a given frame independently or other frames. While this approach allows multiple effects to coexist in a shared system without enforcing tight integration amongst them, this approach also results in the high latency of the overall system. This latency correlates with the number of effects in the effect pipeline.

'Pipeline performance' measures performance as a combination of latency and computation time. 'Latency' refers to the time required by the pipelined system to emit a given unit of data. With respect to an effect pipeline, 'latency' describes the time spent by each image frame in the pipeline, from the moment it enters the first effect in the pipeline, to the time when it exits the last effect in the pipeline.

'Computation time' refers to the time required to process a standard unit of data, e.g., an image frame. Furthermore, computation time may be represented as a function of frame rate for a video system, or a function of actual time to process a frame.

FIG. 11 illustrates a 6-stage frame-based effect pipeline on a multi-core system. In FIG. 11, each effect is assigned to a processor (or core), on the best-case assumption that the number of processors is equal to or exceeds the number of effects in the pipeline. Each processor processes an effect on one complete image frame at a time. The image frame may originate from a video stream, or other source of image frames. Each incoming frame is sequentially processed in turn. For simplicity, each effect is assumed to take the same amount of time to process a frame, which represents the optimal time required to output each frame so as to maintain a consistent frame-rate.

At time t1, frame 1 enters the pipeline, and the first effect is applied to frame 1 by processor 1. At time t2, frame 2 is loaded and processed by processor 1, and frame 1 is loaded and processed by processor 2. At time t3, frame 3 is loaded and processed by processor 1, frame 2 is loaded and processed by processor 2, and frame 1 is loaded and processed by processor 3. From time t4 to t6, frames 4 to 6 are introduced into the pipeline, and frames 1-3 proceed along the pipeline. At the conclusion of time t6, frame 1 emerges from the pipeline.

Pipeline latency can be measured as a function of the time required to process a frame through all of the stages in the pipeline, or in 'frame time,' i.e. the number of frames processed by the first effect in the pipe before the frame N exits the effect pipeline. As a function of frame time, pipeline latency is computed as:

$$PL_{FT}=M-N \qquad (Eq.\ 1)$$

where:
$PL_{FT}$ is the Pipeline Latency, in frame time.
M is the frame entering the pipeline at time instant T.
N is the frame exiting the pipeline at time instant T, and M<N.

For a frame-based architecture, pipeline latency can also be defined as a product of the processing time for the slowest effect in the chain and the number of effects (or stages) in the pipeline. This is computed as:

$$PL_{CT}=N*T_{FM} \qquad (Eq.\ 2)$$

where:
$PL_{CT}$ is the Pipeline Latency, as computation time.
N is the number of stages in the pipeline.
$T_{FM}$ is the time required to process a frame by the slowest effect M in the pipeline.

By assuming that a new frame is fed into the pipeline every 120 ms, that the pipeline contains 6 stages or effects, and that the slowest effect in the pipeline also takes 120 ms to process one frame of data, the Pipeline Latency (PL) for the frame-based system in FIG. 11 is 6*120=960 ms.

Furthermore, since the pipeline latency is measured as a function of time from when the first frame, i.e., frame 1, enters and exits the pipeline, no benefit is incurred by having each processor run every effect consecutively in parallel. That is, even if every frame were immediately available for processing, instead of a new frame being fed consecutively into the pipeline every 120 ms, the pipeline would still have a 6 frame latency and a 960 ms computation time latency, based on the time from when the first frame entered and exited the pipeline.

The above system is limited by the hardware resources available, i.e. processing becomes considerably slower if the number of effects exceeds the number of available independent processing components, or if the cache memory available at each processor is incapable of storing an entire frame.

SUMMARY OF THE INVENTION

The present invention provides a Pipelined Image Processing Engine that implements a flexible and scalable pipeline that manages to adjust for limited hardware resources. The embodiment may also include both static and dynamic load balancing. The example embodiments remove or reduce many of the above restrictions while also offering a generic framework to execute effects in a more efficient manner.

An example embodiment of the present invention may include a method for processing image frames through a pipeline of effects. The method may include generating a plurality of blocks from each frame, processing each block through a pipeline of effects in a predefined consecutive order, and aggregating the processed blocks to produce an output frame by combining the pixels from each processed blocks. Each block may contain a group of primary pixels and a group of total pixels, the total pixels including any pixels required as input by an effect, from the pipeline of effects, to produce output for the primary pixels. The primary pixels in each block are the pixels that will be used for the final frame generated by the pipeline of effects.

The pipeline of effects may be distributed over a plurality of processing nodes, and each effect may process a block, provided as input to the node, to produce output for the primary pixels of the block. Each processing node may independently processes a block using an effect. The effects may be analyzed for scheduling purposes, in order to reduce latency between processing a first block in each frame and the output of a last block in each frame.

The effects may include either spatially or temporal effects. When processing spatial effects, the total pixels in a block may include a plurality of pixels from neighboring blocks. When processing temporal effects, the total pixels may include a plurality of pixels from temporally neighboring image frames.

Block processing and generation may employ different strategies, such as the reducing-extent or a fixed-extent strategies described below, but is not limited thereto and may include combinations and sub-combinations of different strategies. For example, different portions of the effects pipeline may operate using different strategies.

In one embodiment, generating the total pixels may include identifying any pixels required to serially process a block through a plurality of effects, from the pipeline of effects, to produce output for the primary pixels. This may include analyzing a first effect to determine the total pixels required to produce output for the primary pixels, and analyzing a second effect to determine the total pixels required to generate output for the total pixels required by the first effect to produce output for the primary pixels. The processing step may then reduce the number of total pixels in a block after processing the block through the second effect and before processing the first effect.

In another embodiment, the processing step may include updating the total pixels in a block with primary pixels from at least one neighboring block after processing a first effect and before processing a second effect.

Yet another example embodiment may be an apparatus for processing a chain of image frames through an effects pipeline. The apparatus may include a primary processor, a plurality of secondary processors, and a bus. The bus may interconnect the primary processor, the plurality of secondary processors, and a memory interface.

The primary processor may include a block generator, effect distributor, and block aggregator. The block generator may generate a plurality of blocks from an input image frame provided through the memory interface. The effect distributor may manage the distribution and processing order of the effects and the plurality of blocks among the plurality of secondary processors. Finally, the block aggregator may combine the processed blocks.

The plurality of secondary processors may each include a minimum memory cache to store the contents of a block from the block generator. The plurality of secondary processors may each process a block at a time through the pipeline of effects in a consecutive order. The pipeline of effects may be distributed over the plurality of secondary processors. Each secondary processor may execute an effect independently to produce output for the primary pixels for a given block.

BRIEF DESCRIPTION OF THE DRAWINGS

These and other more detailed and specific features of the present invention are more fully disclosed in the following specification, reference being had to the accompanying drawings, in which:

FIG. 5A illustrates an example embodiment of a reducing-extent strategy for processing three area effects in a pipeline scenario, in accordance with the present invention.

FIG. 5B illustrates the process for determining the size of the outer extent necessary for generating output for a desired primary data region given the three effects in FIG. 5A.

FIG. 7 illustrates an example embodiment of a process for executing the effect pipeline on a multi-core processor, in accordance with the present invention.

FIG. 10A illustrates an example of a distributed unbalanced effect pipeline.

FIG. 10B illustrates an example of a distributed load balanced effect pipeline.

DETAILED DESCRIPTION OF THE INVENTION

In the following description, for purposes of explanation, numerous details are set forth, such as flowcharts, system configurations, and processing architectures in order to provide an understanding of one or more embodiments of the present invention. However, it is and will be apparent to one skilled in the art that these specific details are not required in order to practice the present invention.

The present invention provides a Pipelined Image Processing Engine that implements a flexible and scalable pipeline that adjusts for limited hardware resources. The embodiment reduces the minimum quotient of work processed by each 'effect' from a frame to a 'block'. Each block represents a subset of an entire frame. Block-based processing breaks down each frame worth of data into N partially-overlapping or non-overlapping blocks, and allows each effect at any stage of the pipeline to process the block independently of other blocks. This allows multiple effects to work simultaneously without waiting for an entire frame or field to be available, and also does away with the need for complicated synchronization mechanisms. Each block is self-contained, and holds enough frame data for each effect to work on it independently. Because the blocks are self-contained and the various effects working on the various blocks are loosely coupled, the framework can easily assign more physical processors to slower effects in the pipeline, while allocating fewer physical processors to lightweight, simple effects. Furthermore, the processor assignments can change from one frame to the next, without any user intervention.

The present invention may be embodied in various forms, including business processes, computer implemented methods, computer program products, computer systems and networks, user interfaces, application programming interfaces, and the like.

Figure 1:
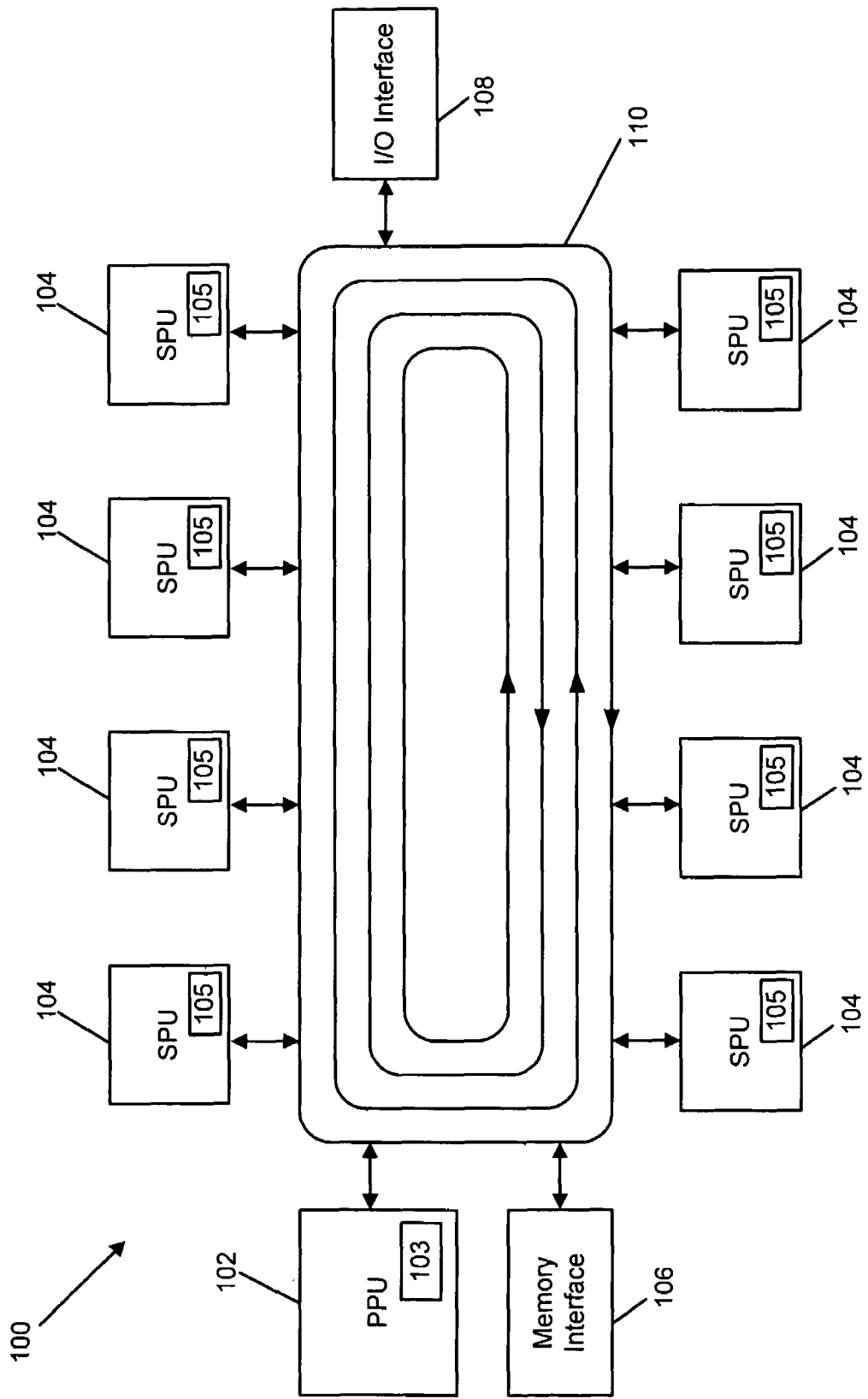
FIG. 1 is an example embodiment of a multi-core processor in accordance with the present invention.

FIG. 1 illustrates an example embodiment of a multi-core processor 100 in accordance with the present invention.

The multi-core processor 100 may include a pool of discrete single processor units (SPUs) 104 connected together by a very fast internal bus 110. The multi-core processor 100 may also include a parallel processing unit (PPU) 102, a memory interface 106, and an Input/Output interface 108. PPU 102 may coordinate the distribution of processing tasks between SPUs 104. PPU 102 may also contain a local memory cache 103 for storing information and instruction relating to running processes or effects. Each SPU 104 may include a memory cache 105, which is used to store information related to a running process or effect allocated to that SPU 104.

During operation, input containing an effect pipeline and a plurality of image frames may be provided to the multi-core processor 100 via Input/Output interface 108. The PPU 102 may parse the effect pipeline into a plurality of discrete effects. Each image frame may be analyzed in conjunction with the plurality of effects and separated into pixel blocks. The PPU 102 may then distribute the effects and the blocks among the SPUs 104 for processing. After the SPUs 104 process the blocks based on the effects, the PPU 102 may aggregate the processed blocks into complete output image frames.

While FIG. 1 illustrates an architecture having distinct PPU 102 and SPUs 104, one of ordinary skill will appreciate that the invention is not limited thereto, and may be implemented on a general purpose architecture containing uniform multi-core processors or other types of specialized architectures.

Figure 2:
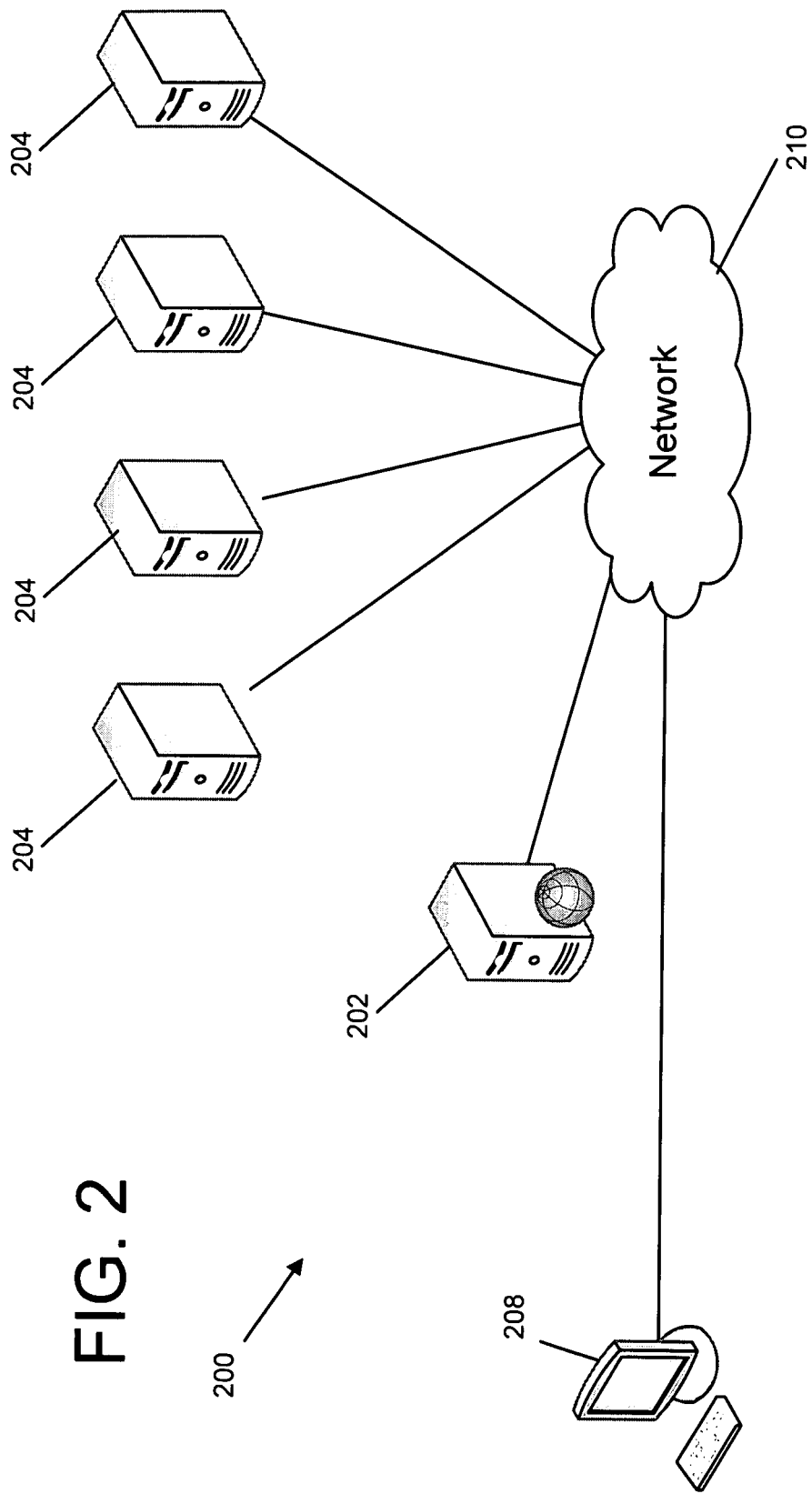
FIG. 2 is a second example embodiment of a computer cluster in accordance with the present invention.

FIG. 2 illustrates a second example embodiment of the present invention in the form of a computer cluster 200 capable of distributing the workload associated with processing an effect pipeline. The computer cluster 200 may include a pool of discrete processing units (DPUs) 204 connected together by a network 210. The computer cluster 200 may also include a cluster managing unit (CMU) 202 and a control terminal 208. CMU 202 may coordinate the allocation of processing tasks between DPUs 204. CMU 202 may also include a cluster monitor for tracking the progress, load, and effects distributed to each DPU 204.

During operation, the effect pipeline and a plurality of image frames may be provided to the CMU 202 from terminal 208 or another source having access to network 210. The CMU 202 may parse the effect pipeline into discrete effects. Each image frame may be analyzed in conjunction with the effects and separated into pixel blocks. The CMU 202 may then distribute the effects and the pixel blocks among the DPUs 204 for processing.

Types of Effects

With respect to blocks of pixel data, an 'effect' is a process that changes or distorts a block of pixels. Each block is composed of a plurality of pixels, e.g., a rectangular or square grid of pixels. A block having M×N pixels could be processed in parallel all at once if M×N processing elements were simultaneously available. This is only possible if each input pixel provides all the necessary data for a given effect to produce a corresponding output pixel. However, a lot of effects rely on an input pixel and neighboring pixels to properly change or distort the input pixel into the output pixel.

Effects can be categorized into three types: point effects, area effects, and range effects. A 'point effect' is an effect which produces an output pixel based on just one input pixel. Color correcting effects fall in this category. An 'area effect' is an effect requiring a certain amount of neighboring pixels apart from a given input pixel to produce an output pixel. Convolution filters, such as blur effects, are area effects. Area effects offer some challenges for parallelism, especially relating to memory footprints and performance. A 'range effect' is an effect which needs a whole frame as input to produce a single output pixel. Histogram effects are commonly range effects, since they require an analysis of the entire frame prior to generating any output pixels. Range effects pose the largest challenge to parallelism.

While the above effects are described with respect to the spatial domain (i.e., they operate using a single frame of data) these effects may also operate in the temporal domain. Temporal domain effects may require data from temporally neighboring frames. For example, a temporal area effect may need neighboring frame input pixel data to produce the output pixel data in a single frame, and a temporal Range Effect may require all of the frames of a clip or sequence to produce the pixel data for a single output frame. By example, a Box Blur is a spatial area effect, whereas as a Motion Blur is a temporal area effect. Furthermore, effects may work in both domains. For example, Interlaced-to-Progressive Conversion is a spatial-temporal area effect, as it needs neighboring data in both the spatial (single-frame) domain and the temporal domain (neighboring frames).

Block Division

In order to reduce the quantum of work associated with a frame, each frame may be divide into smaller sub-frames, or 'blocks' of data.

Figure 3:
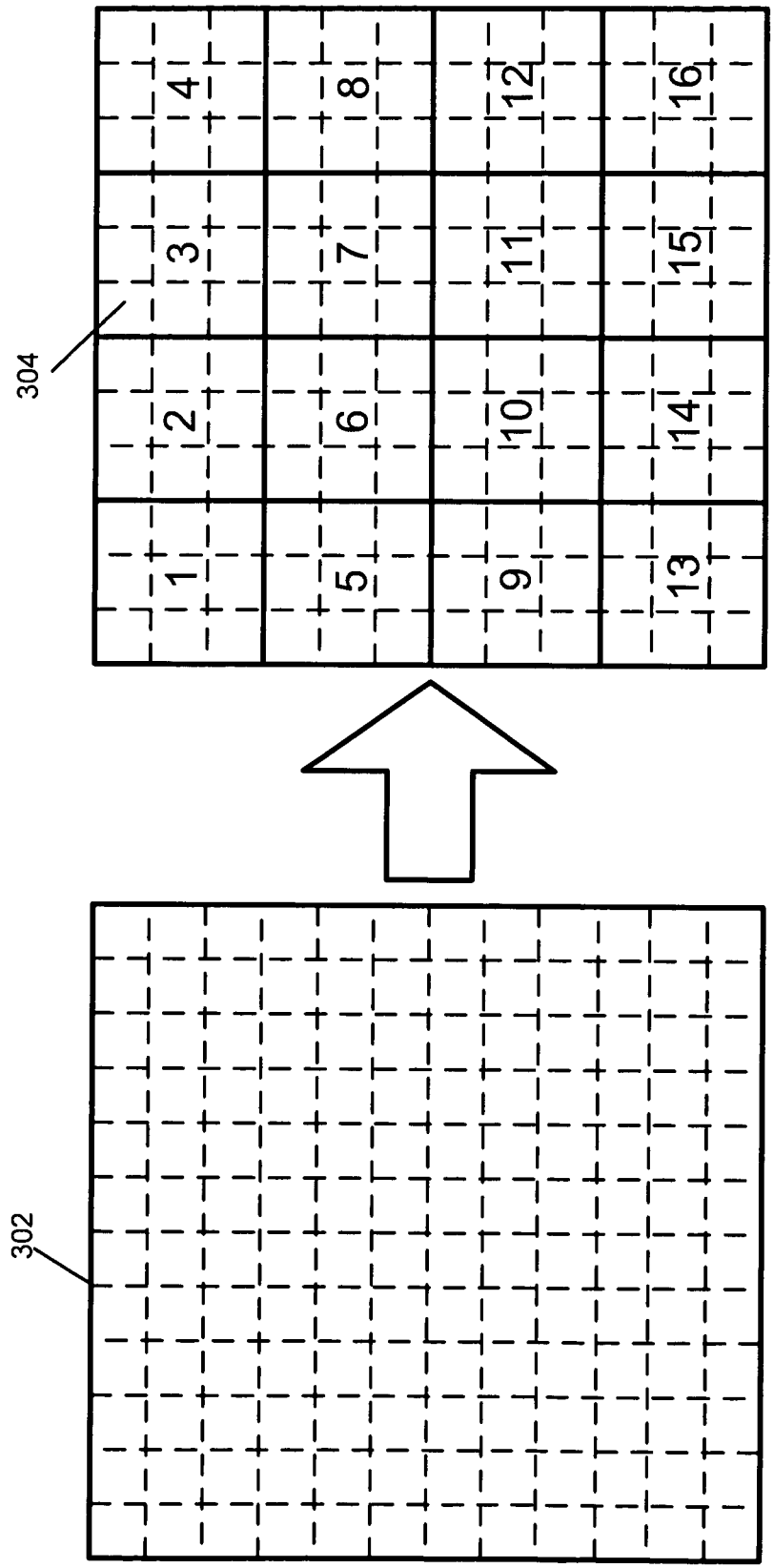
FIG. 3 illustrates a 12×12 pixel frame divided into 16 uniform blocks.

FIG. 3 illustrates a 12×12 pixel frame 302 divided into 16 uniform blocks 304 (illustrated as blocks 1-16). While frame 302 contains 12×12 pixels, each of the blocks 304 (304-1 to 304-16) may contain 3×3 pixels; requiring 16 blocks to completely map frame 302 to blocks 304. It will be understood that the 12×12 pixel frame 302 is provided simply for exemplary purposes and is not limiting the invention in any way to a particular frame size, resolution, or aspect ratio.

The example embodiment may maintain the same dimension for all of the blocks in a given frame. This may provide an even distribution of work among all of the SPUs 104. However, the distribution of block sizes may follow a different scheme. For example, in the case where greater dependency exists among certain pixels in an effect, those pixels may be grouped into a single block to promote parallelism. Furthermore, a particular frame may be divided based on various criteria, such a color relationships, object identification, etc. Finally, the criteria for block sizes may also produce blocks having similar work quotients, such that the processing time for a given effect on different blocks remains roughly uniform.

Block division (or aggregation) by itself is not an inherently parallel task, and hence may be relegated to a single processor, e.g., PPU 102, that can access the results of the plurality of the SPUs 104 and may have access to greater available memory resources. Since the PPU 102 has the ability to access the entire frame at once, whereas the SPUs 104 may preferably operate on discrete blocks, the block division and aggregation processes may be relegated to the PPU 102. Furthermore, the interaction between the PPU 102 and SPUs 104 may preferably be minimized once the blocks 304 are offloaded to the SPUs 104. This promotes maximum computational throughput by leveraging the plurality of high-speed SPUs 104, while avoiding delays associated with cross-processes or communications.

Breaking up the frame into non-overlapping, unique blocks works well when dealing with point effects. However, with respect to area effects, the same non-overlapping blocks may still contribute to the output, but require extra pixel data around the edges. For example, a 5×5 pixel block may be necessary to modify or output a 3×3 pixel block 304.

With respect to blocks 304, the portion of the block 304 which may be modified by the effect is referred to as the 'primary data' 402. Additional data bordering the primary data 402, referred to as 'edge data' 406 may be necessary to facilitate processing the area effect. The combination of the primary data 402 and edge data 406 is referred to as the 'total data' for a block 304. Similarly, the area covered by the primary data 402 is referred to as the 'inner extent' 404, while the area covered by the combination of the primary data 402 and the edge data 406 is referred to as the 'outer extent' 408.

Figure 4:
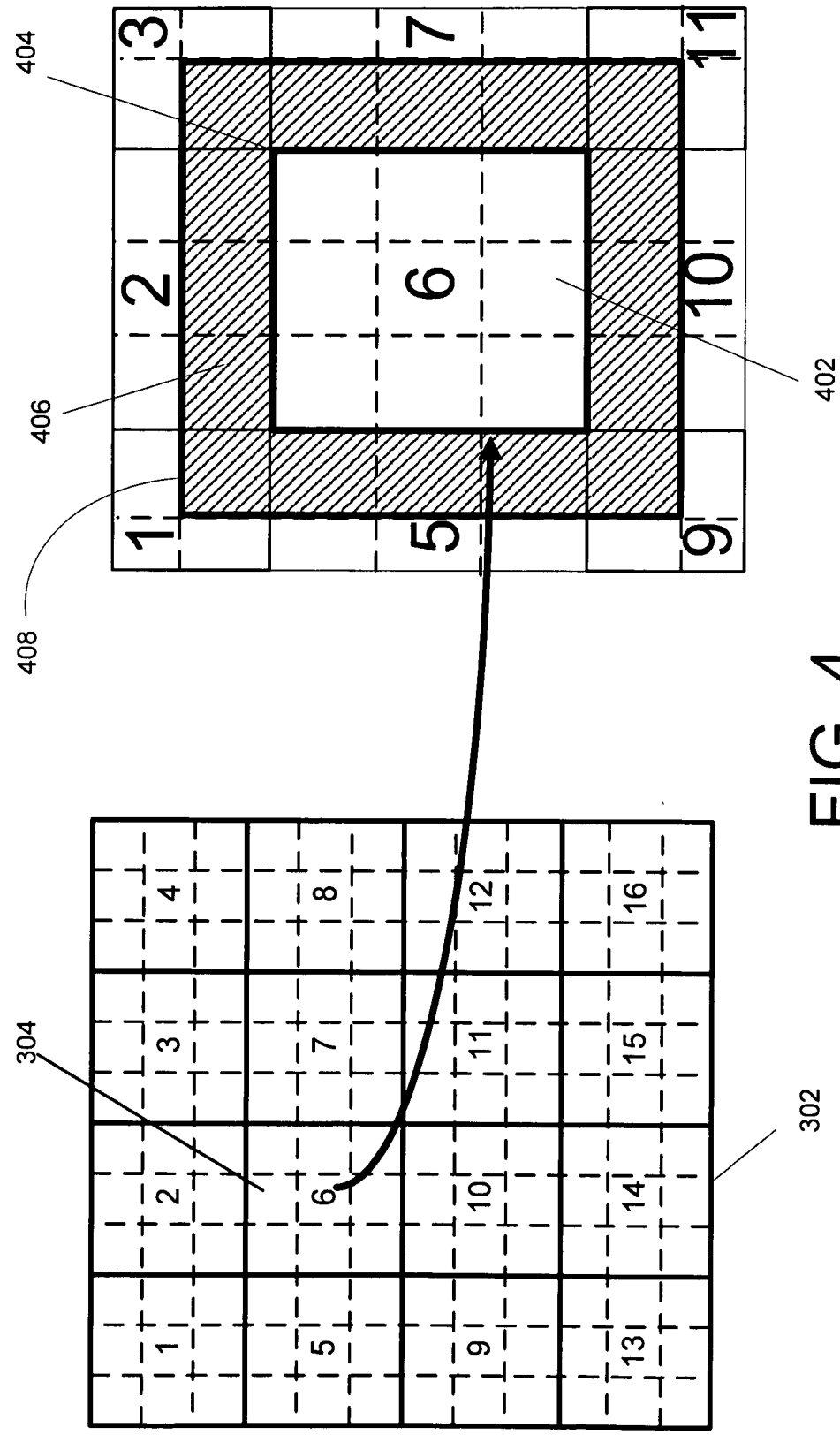
FIG. 4 illustrates a block formed from a 12×12 pixel frame.

The amount of edge data 406 required is dependent on the area effect. For example, a Convolution Effect may need a 1 pixel wide perimeter worth of edge data 406 for each block 304. FIG. 4 illustrates the block division of a 12×12 pixel frame 302. In FIG. 4, the pixel frame 302 is divided into sixteen 3×3 pixel blocks 304 (304-1 to 304-16). For example, while block 304-6 may have a 3×3 pixel primary data 402 having inner extent 404, the total data encompasses a 5×5 pixel region, including both primary data 402 and bordering pixel-wide edge data 406 having outer extent 408.

In this example, the edge data 406 of each block overlaps with the primary data 402 of at least one adjoining block 304. This edge data 406 may be included redundantly to make the blocks 304 as self-contained as possible with respect to the effect processing, in order to achieve maximum performance. Blocks 304 which lie at the edge of the frame 302 may include manufactured edge data 406 to ensure that they can be processed uniformly. For example, this edge data 406 may include copies of the frame's 302 border pixels, or be set to a fixed value.

In the example embodiment of FIG. 4, all of the edge data 410 of block 304-6 lies within the inner extent 404 of adjoining blocks 304; as such, block 304-6 is considered to be an 'interior block'. By contrast, two edges of block 304-16 coincide with the edges of the frame 302; as such, a portion of the edge data 406 for block 304-16 will need to be manufactured as described above. Manufacturing the edge data 406 for edge blocks 304 at block creation time may avoid requiring individual effects to have special boundary condition checks, and avoid requiring the effects to distinguish between interior or edge blocks 304.

The size of the block 304 excluding any edge data 406 is also referred 'primary block size', because this is the only part of the block 304 which contributes to the final output image frame. The size of the block, inclusive of edge data, is referred to as the 'total block size'.

In FIG. 4, the primary block size for each block 304 may be 9 pixels, while the total block size may be 25. Because these blocks are square, each side can be computed by just adding the pixels from the edge data 406 to the output block size.

While the disclosed block division is described with respect to spatial effects, it will be understood by one of ordinary skill, that the block division may also function in the temporal domain. When functioning in the temporal domain, the blocks 304 mainly include pixels from temporally neighboring frames, and the total block size may be either two or three dimensional, instead of being two dimensional as in the spatial domain.

While FIG. 5 illustrates a primary block size for each block 304 of 9 pixels and a total block size of 25, one of ordinary skill will appreciate that this implementation can be extended to non-square blocks by considering the edge requirements of each effect in the pipeline for each dimension independently. Furthermore, the implementation may also extend to multi-dimensional domains (where the blocks would not be two-dimensional, but multi-dimensional instead i.e., n-dimensional).

Block Edges in Pipelined Systems

In the context of an effect pipeline containing a plurality of effects, multiple area effects will each consecutively compound the edge requirements for the total block size. The following example embodiment will be described with respect to an effect pipeline including three area effects, each area effect requiring an edge of 1 pixel width. However, it will be understood that a given effect may require various edge pixel widths, which may or may not be uniformly distributed around the inner extent 404.

The primary data 402 in this example may include blocks 304 having an inner block size of 9 pixels and a total block size of 25 pixels. Adding the edge data 406 results in a block of size 25 pixels, which carries enough information for the first effect in the pipeline to produce output for the primary data 402. However, once the first effect processes the block 304, the next area effect in the pipeline may not have enough data to produce data for the primary data 402 using the remaining 3×3 pixels of data, or alternatively the next effect may have to access unmodified edge data 406 which is inconsistent with the modified primary data 402. This is because the edge data 406 of the block 304 will still be the same as when the first effect received it while the primary data 402 will reflect the output of the first effect. To address the pipeline situation, it may be necessary to provide a larger total block size, since each successive area effect may only be capable of producing output for an incrementally smaller region.

FIG. 5A illustrates an example embodiment of a reducing-extent strategy for processing three area effects in a pipeline scenario. This example embodiment overcomes the reduction from successive area effects by adding extra edge data 406 for each successive area effect in the pipeline, allowing each preceding area effect to process the edge data 406 for the succeeding effects as part of its output.

In the exemplified reducing-extent strategy, a pixel block is processed successively by three area effects. With this strategy, the outer extents of the block 304 shrink successively as the block 304 is processed by each effect. Within the context of the above example, the first effect processes 81 pixels, and outputs or modifies 49 pixels, the second effect processes 49 modified pixels and outputs or modifies 25 pixels, and the third effect processes the 25 modified pixels, and outputs or modifies 9 pixels within the inner extent 404.

In the first step, the primary block size is 9 pixels, while the total block size is 81 pixels. The first area effect is provided with a block 304 having outer extent 408-3, which produces output for total data having outer extent 408-2. The second area effect is provided with total data having outer extent 408-2, which produces output for total data having outer extent 408-1. The third area effect is then provided with a block 304 having outer extent 408-1, and produces output for primary data 402.

FIG. 5B illustrates the process for determining the size of the outer extent 408 necessary for generating output for a desired primary data 402 region given the three effects in FIG. 5A, using the reducing-extent strategy. The outer extents 408 of the block are determined by taking the desired inner extent 404 (3×3 pixels in our example), and adding edge data 406 for the last area effect in the pipeline (to get an outer extent 408-1 of 5×5 pixels), then backtracking to the intermediate area effect (to get an outer extent 408-2 of 7×7 pixels), and then backtracking to the outer extent 506 of the last effect (to get an outer extent 408-3 of 9×9 pixels). This process generates a block size having an outer extent 408-3 of 9×9 pixels.

An alternate way of computing this is to simply add the edge dimensions required by each effect in the pipeline to the dimensions of the primary data 402. Given that the block's raw dimensions of the primary data 402 are 3×3 pixels, and each effect needs a 1 pixel boundary (an additional 2 pixels in each dimension), the total dimensions are 9×9.

The reducing-extent strategy benefits from a high degree of independence granted to each block 304 while traversing the pipeline. That is, once a block 304 enters the pipeline, it does not need to synchronize with any other adjacent blocks 304, nor is any controlling mechanism necessary to ensure data integrity until the data block 304 exits the pipeline. This also offers the maximum latitude in reducing pipeline latency.

While the reducing-extent strategy incurs an extra cost in the form of processing time and storage of the total data for all the effects in the pipeline, excluding the last stage, the cost and latency may be reduced by distinguishing between point and area effects and placing any point effects towards the end of the pipeline (after the last area effect).

Figure 6A:
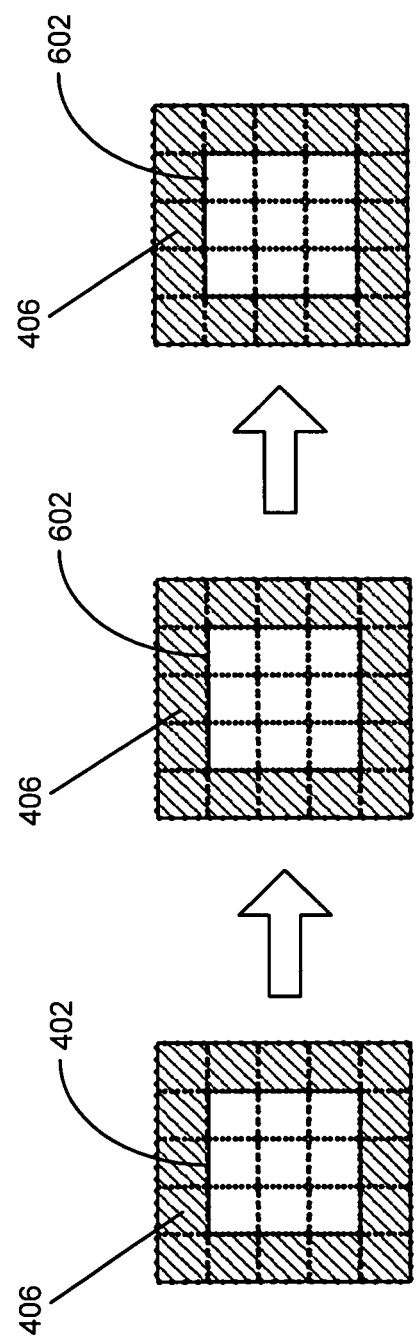
FIG. 6A illustrates a fixed-extent strategy for processing a pipeline of effects, in accordance with the present invention.

FIG. 6A illustrates a fixed-extent strategy for processing a pipeline of effects. In the fixed-extent strategy, only one effect is processed at each stage of the pipeline before each block 304 is synchronized with neighboring blocks 304. After a given block 304 is synchronized with its neighbors, it may be processed by the next effect in the pipeline. This strategy may increase the pipeline latency by some margin, but reduces the computation overhead.

FIG. 6A illustrates an example embodiment of the fixed-extent strategy where the inner extents 404 and outer extents 408 for all effects are the same. In FIG. 6A, each effect only processes the primary data 402 using the total data as input. Synchronization with neighboring blocks 304 after each area effect is processed ensures that all of the data in the block 304 is updated with primary data 402 from neighboring blocks 304 before the next effect is processed.

The efficiency of the fixed-extent strategy may be effected by the order in which the blocks 304 are processed. Since the fixed-extent strategy requires the synchronization of post-effect data between neighboring blocks 304, a given second (or current) effect cannot begin processing a given block until a first (or prior) effect has processed all of the given blocks neighboring blocks 304, and the given block's edge data 406 has been synchronized with its neighboring blocks 304. By example, after being processed by a first effect, block 304-1 must be synchronized with its surrounding blocks, i.e., blocks 304-2, 304-5, and 304-6, prior to being processed by a second effect. Similarly, block 304-6 must be synchronized with blocks 304-1, 304-2, 304-3, 304-5, 304-7, 304-9, 304-10, and 304-11.

Figure 6C:
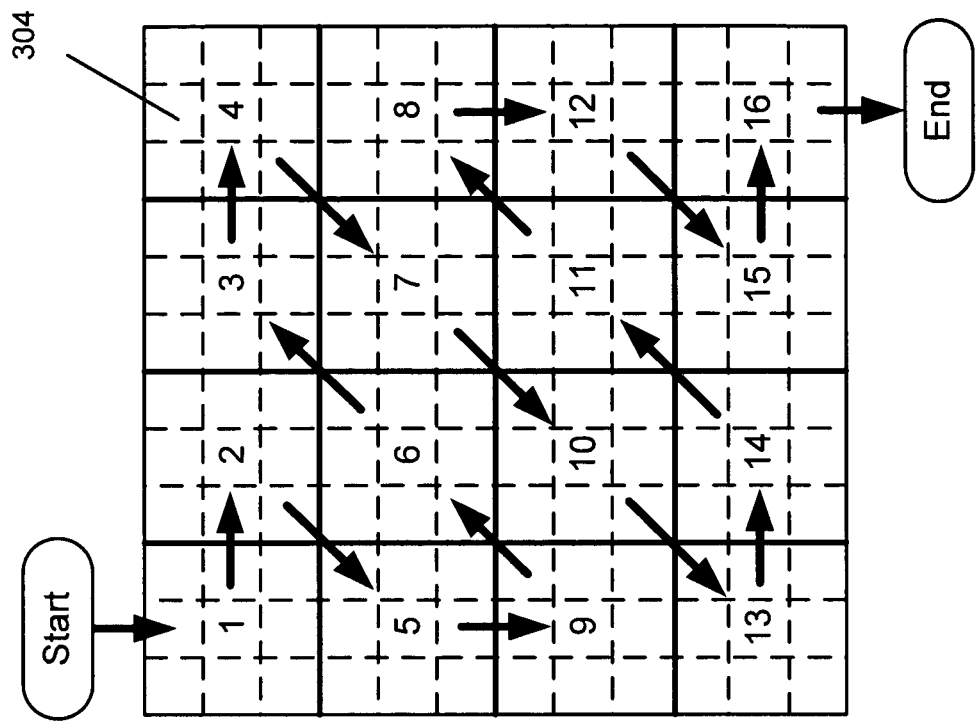
FIG. 6C is a second example embodiment of a block traversal strategy.
Figure 6B:
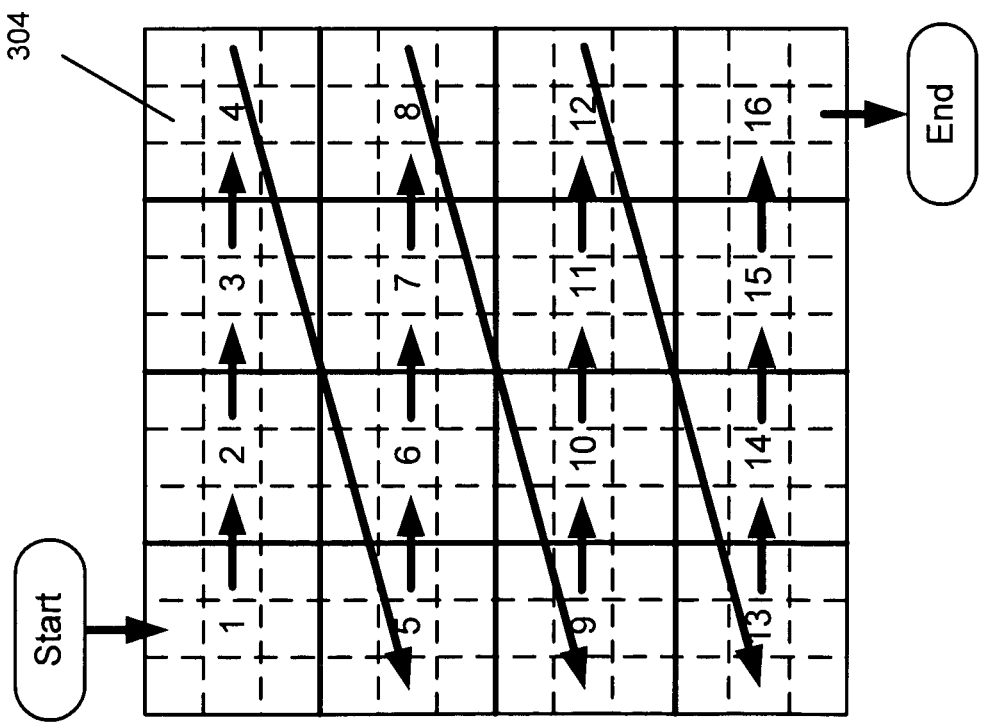
FIG. 6B is a first example embodiment of a block traversal strategy.

FIG. 6B illustrates an example embodiment of a block traversal strategy where blocks are processed in consecutive order. While being the simplest processing strategy, the strategy may not be the most efficient. Given the parallel nature of the multi-processor 100, the PPU 104 may begin synchronizing a given block's edge data 406 immediately after its neighboring blocks 304 have been processed. By example, after being processed by a first effect, block 304-1 must wait for 5, i.e. blocks 304-2 to 304-6, to be processed before it may be synchronized. Similarly, after being processed by a first effect, block 304-6 must wait for 5, i.e. blocks 304-7 to 304-11, to be processed before it may be synchronized. As such, alternative block traversal strategies can improve the parallelism of the fixed-extent strategy.

FIG. 6C illustrates an example embodiment of an alternative block traversal strategy, where blocks are processed so as to reduce the number of blocks 304 that must be processed before a given block can be synchronized. By Example, after being processed by a first effect, block 304-1 must wait for only 3 other blocks, i.e. blocks 304-2, 304-5, to 304-6, to be processed before it may be synchronized. For block 304-1, both strategies need exchange of data with 3 neighboring blocks 304. The alternative block traversal strategy, is more useful as the number of blocks 304 to actually wait for while the 3 neighboring blocks 304 get processed is fixed (4 blocks), and independent of the total number of blocks 304 in the frame. By contrast, in the original traversal strategy of FIG. 6B, even though block 304-1 is dependent on the same number of blocks 304, it needs to wait for all of the other blocks 304 in the same row (304-2 through 304-4) and the the two dependent blocks in the following row (304-5 and 304-6) of the frame to be processed. This includes three dependent blocks (304-2, 304-5, 304-6), and two independent blocks (304-3, 304-4); the latter are included because of the traversal strategy (for all rows from top to bottom, traverse left or right in each row). This may be more significant for frames with large block distributions (e.g. for a 100×100 block frame, block 0 may need to wait for 101 blocks—3 dependent blocks, and 98 independent blocks—utilizing the strategy of FIG. 6B, but still only 4 blocks 304—3 dependent blocks, 1 independent block—utilizing the strategy of FIG. 6C).

While FIG. 6C shows one alternative strategy for processing blocks 304, this strategy is only exemplary and intended to show the benefit of changing the potential traversal order for processing blocks 304. Further, alternative traversal strategies would be possible within the spirit of the invention. For example, alternative strategies may improve the performance by optimizing for different block division strategies, effects in the pipeline, memory capacity, processor speeds, etc.

Pipeline Processing

FIG. 7 illustrates an example embodiment of a process 700 to execute the effect pipeline on multi-core processor 100, in accordance with the present invention. While process 700 may be implemented on various systems, it is described with respect to multi-core processor 100 for clarity.

At step 702, multi-core processor 100 may receive input identifying an effect pipeline. The effect pipeline may identify a plurality of effects that may be executed by SPUs 104 to process pixel blocks 304. The plurality of effects may be analyzed by PPU 102 to identify the spatial/temporal edge requirements for each effect.

At step 704, the effects may be assigned and distributed among the plurality SPUs 104, based on the analysis in step 702. The PPU 102 may assign one effect to each SPU 104. Alternatively, the PPU 102 may assign multiple simple, quick running effects to a single SPU 104, and assign complex, slow-running effects to multiple SPUs 104. In yet another alternative embodiment, the system may rely on dynamic load balancing to manage the allocation of effects among the various SPUs 104.

At step 706, the PPU 102 may receive an image frame 302 for processing in accordance with the effect pipeline. Alternatively, the PPU 102 may read the image frames 302 from a memory via memory interface 106 or any other accessible data source.

At step 708, the PPU 102 may generate data blocks 304 from an image frame 302. The size and structure of the data blocks 304 may be predefined or may be dependent on the processing requirements of the individual effects, as well as the processing strategy employed.

At step 710, the PPU 102 may provide each data block 304 to an SPU 104 assigned to the first effect in the effect pipeline. Each data block 304 may then traverse the plurality of effects from the effects pipeline in an order defined by the effect pipeline.

At step 712, after the data block 304 is processed by the last effect, as determined by the effect pipeline, the data blocks 304 may be aggregated by the PPU 102 in the MEMORY cache 103 or other memory. The PPU 102 may then combine the aggregated data blocks 304 into an image frame 302.

At step 714, if any further image frames 302 need to be processed through the effects pipeline, the process returns to step 706; otherwise, the process ends.

Figure 11:
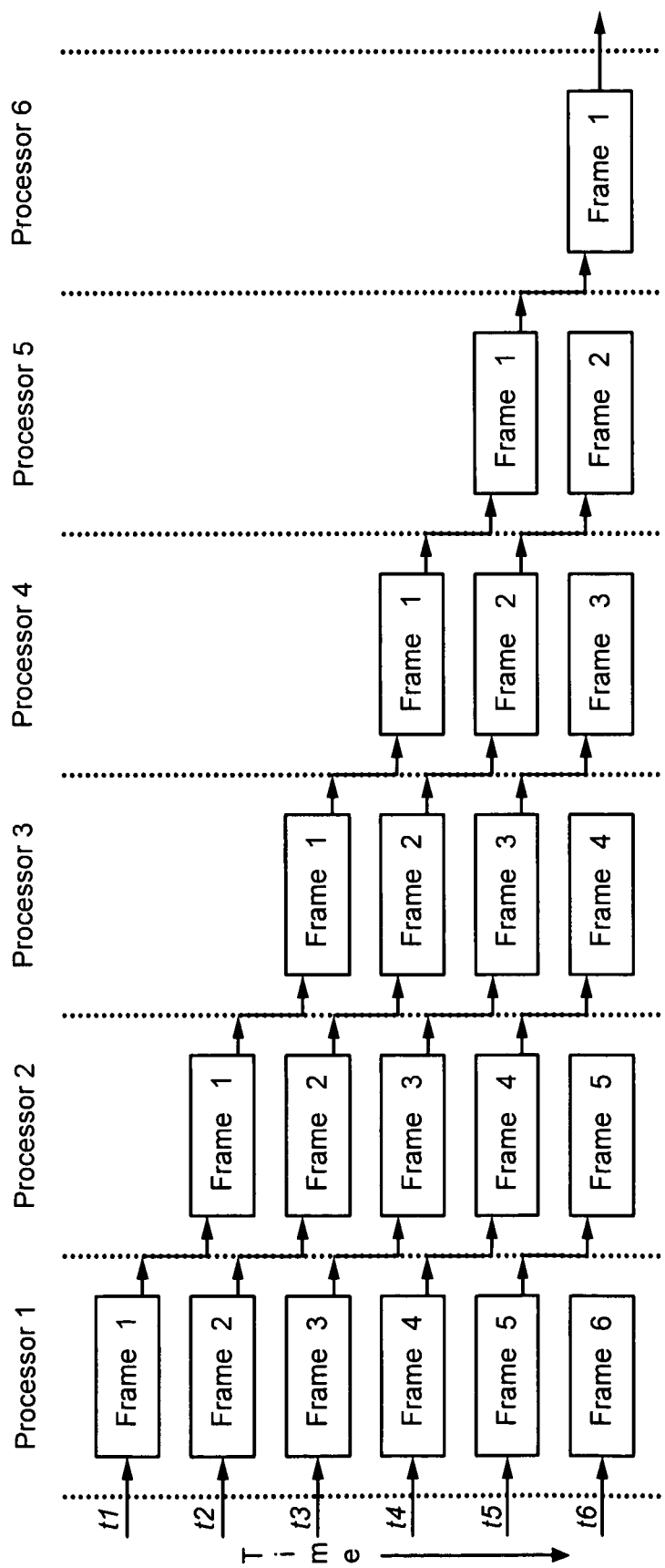
FIG. 11 illustrates a conventional effect pipeline on a multi-core system.

FIG. 11 illustrates that in the prior art, the expected latency in a 6-stage effect pipeline is six frames, because each frame, by definition, takes one frame time to process.

Figure 8:
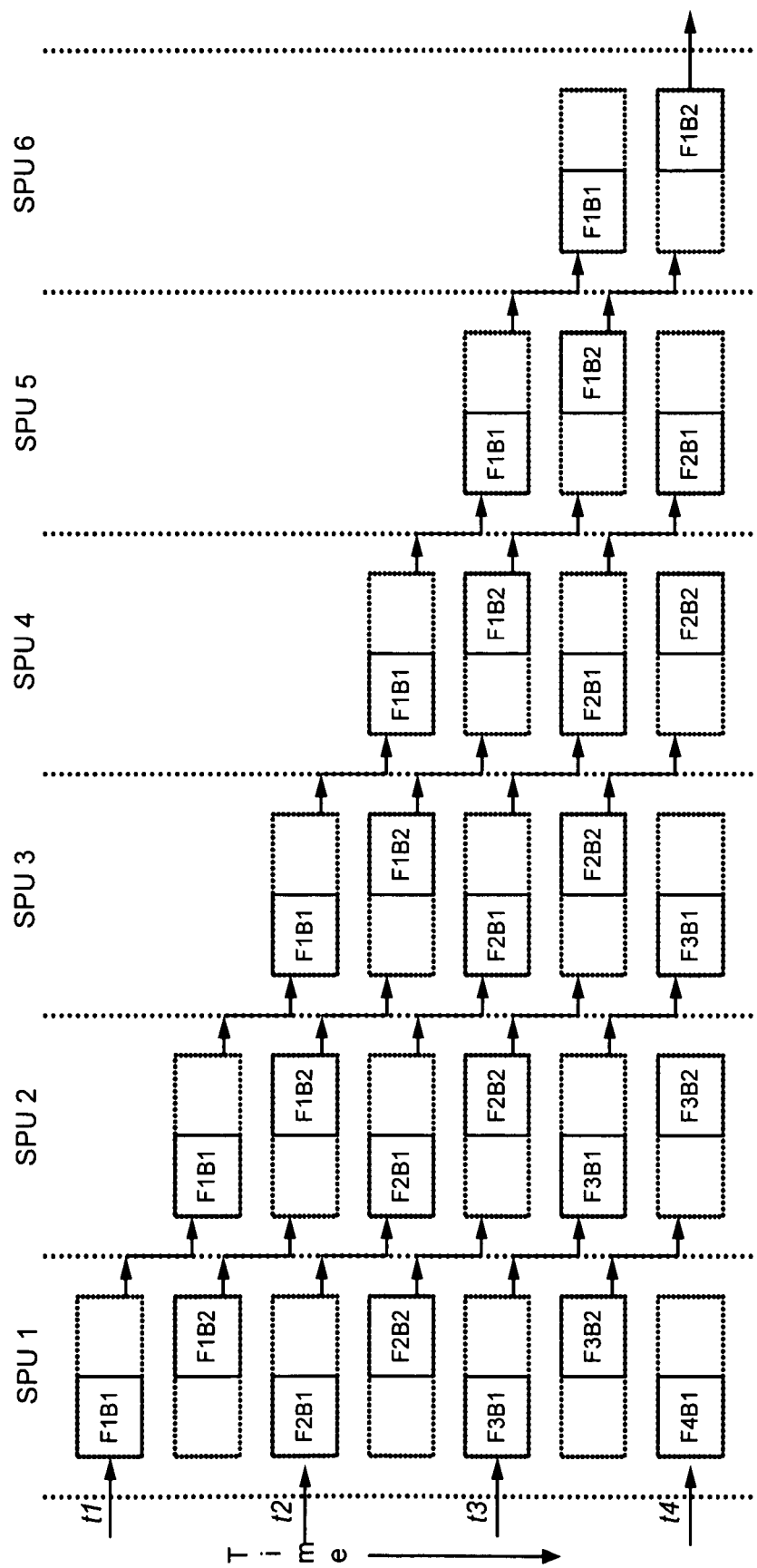
FIG. 8 illustrates a first modified effect pipeline, with the minimum quantum of work reduced to a block size of a half-frame, in accordance with the present invention.

FIG. 8 illustrates a modified effect pipeline, with the minimum quantum of work reduced to a block 304. In this embodiment, each block 304 is equivalent to half a frame 302, and is, therefore, processed by each effect in ½ frame time. As FIG. 8 illustrates, this can reduce the latency from 6 frames to 3½ frames.

In FIG. 8, the first half-frame F1B1 is processed within 3 frames (½ frame×6 effects). The second half-frame F1B2 is also processed within 3 frames, but only enters the pipeline ½ frame after first half-frame F1B1. As a result, the second half-frame F1B2 exits the pipeline within 3½ frames (½ frame×6 effects+½ frame delay), resulting in a total frame time latency of 3½ frames for the entire first frame 302.

Figure 9:
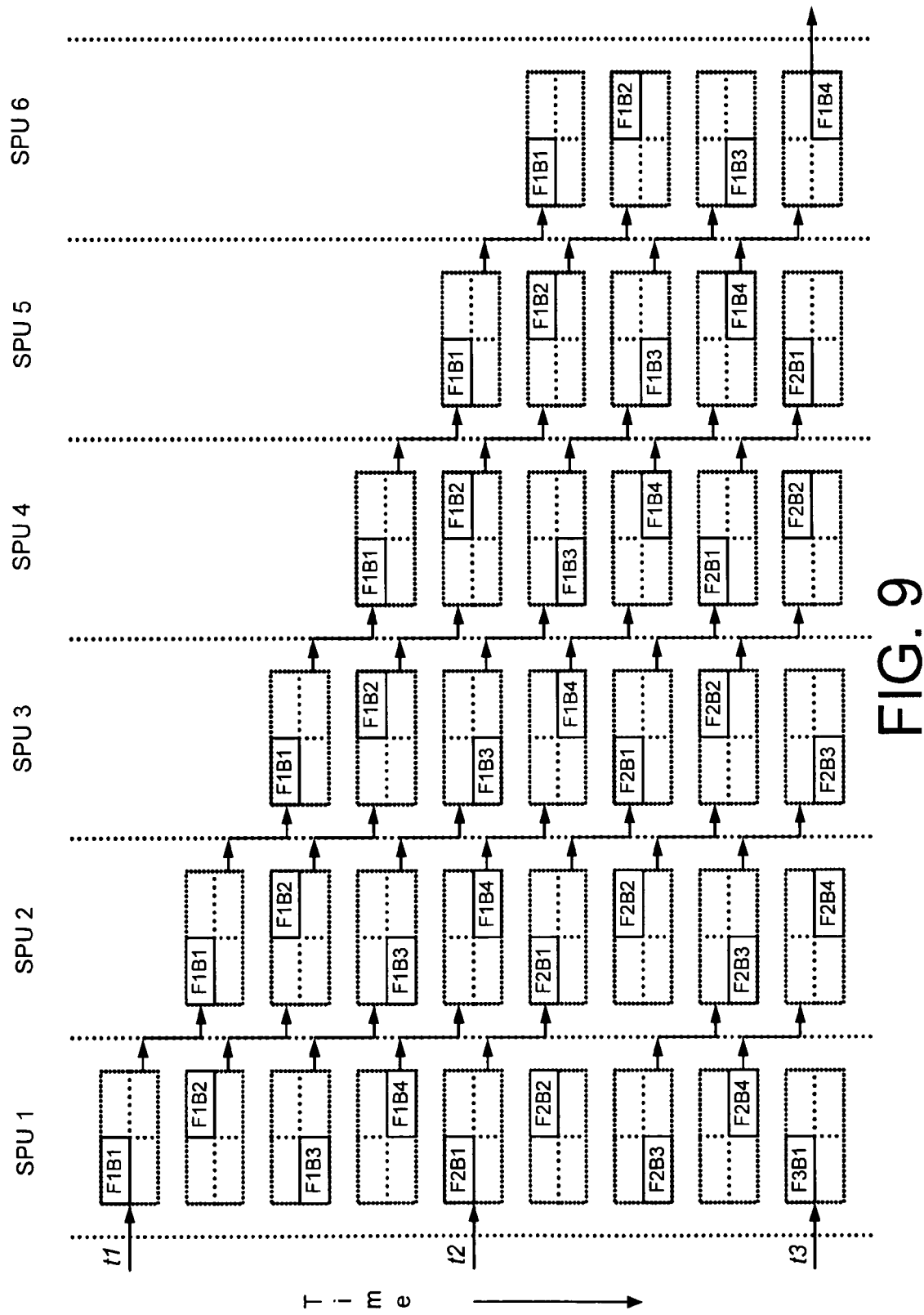
FIG. 9 uses the same effect pipeline within the block-based framework of FIG. 8, but with the block size reduced to a quarter-frame.

The example embodiment illustrated in FIG. 9 uses the same effect pipeline within the block-based framework of FIG. 8, but with the block size reduced to a quarter-frame. This embodiment generates a pipeline latency improvement from 6 frames to 2¼ frames by reducing the block size again, as compared to the prior art.

In FIG. 9, the first quarter-frame F1B1 is processed within 1½ frames (¼ frame×6 effects). The quarter-frame F1B2 is also processed within 1½ frames, but only enters the pipeline ¼ frame after first quarter-frame F1B1. As a result, the second quarter-frame F1B2 exits the pipeline within 1¾ frames (¼ frame×6 effects+¼ frame delay). The third and fourth quarter-frames, F1B3 and F1B4, also exit the pipeline ½ frame and ¾ frame after the first quarter-frame F1B1. As a result, the first frame is processed within 2¼ frames.

The above examples clearly show the advantages of Block-Based Effect Processing over Frame-Based Effect Processing. As the block sizes continue to reduce, it becomes possible to obtain higher gains with respect to pipeline latency; however, the gains become incrementally smaller. Eventually, the latency introduced from the data transfer of the data blocks 304, and other computational aspects of the process exceed the gains from further block reduction.

Similarly to traditional frame-based architecture, pipeline latency for the block-based system can also be defined as a product of the processing time for the slowest effect in the chain and the number of effects (or stages) in the pipeline. However, switching to a block-based architecture reduces this to the sum of time taken by the slowest effect to process one frame 302 of data added to the product of the time taken by the slowest effect M to process one block 304 of data and the number of effects (or stages) minus 1. Block-based pipeline latency, as computation time, can be calculated as:

$$PL_{CT} = (S*T_{BM}) + ((N-1)*T_{BM}) \qquad \text{(Eq. 3)}$$

where:

$PL_{CT}$ is the Pipeline Latency, as computation time.

N is the number of stages/effects in the pipeline.

S is the number of blocks 304 generated from each frame 302.

$T_{BM}$ is the time required to process a block by the slowest effect M in the pipeline. Assuming that the overhead cost associated with block processing is negligible this computes to a processing time of:

$$T_{FM} = (S*T_{BM}) \qquad \text{(Eq. 4)}$$

For example, the $PL_{CT}$ for the block-based system illustrated in FIG. 7 where S=2 becomes (2*60)+(5*60)=420 ms. $T_{BM}$ is simply computed as $T_{FM}/S$ because we ignore any overhead associated with the switch to block-processing.

Computing the PL in frame-times yields the formula:

$$PL_{FT} = PL_{CT}/FR \qquad \text{(Eq. 5)}$$

where:

$PL_{FT}$ is the Pipeline Latency, in frame times.

$PL_{CT}$ is the Pipeline Latency, as computation time.

FR is the effective frame rate.

Using the above numbers, the $PL_{FT}$ for the example in FIG. 8 is 420/120=3.5 frames, which is identical to the number computed earlier. The example illustrated in FIG. 9 yields a $PL_{CT}$ of 270 ms and $PL_{FT}$ of 2.25 frames.

As noted earlier, these examples assume the overhead of block-based processing is negligible. Real-world scenarios may have either higher computation times for effects located earlier on in the pipeline (Reducing-extent Strategy), or greater synchronization overhead, and hence reduce pipeline latency (Fixed-extent Strategy).

Memory Requirements

The block-based system offers significant advantages in terms of the memory footprint of the pipeline. The traditional frame-based N stage pipeline needs at least N frame buffers to keep all stages operating. Because frame I/O is handled outside of the effect pipeline, such a system would need a few extra frame buffers for that purpose also (2 at the very minimum, one for input, and one for output, and 4 if double-buffering of the I/O operations is employed). Hence, the minimum frame buffers required to process the pipeline is effectively N+2.

If P represents the number of processor elements available in the system for the pipeline, the buffers required would reduce to a minimum of (P, N) buffers because, if the number of processor elements is less than the number of stages in the pipeline, the system can only process P frames 302 simultaneously. Conversely, if the number of pipeline stages is less than the number of processor elements, then the system can only process N buffers simultaneously, as the additional processor elements will remain idle.

The formula to compute the minimum number of frame buffers required by the traditional frame-based pipeline can be derived as:

$$Y_F = \min(P, N) + 2 \quad \text{(Eq. 6)}$$

where:
 $Y_F$ is the minimum number of frame buffers required to process the pipeline
 P is the number of processor elements available
 N is the number of stages/effects in the pipeline The actual memory requirement for the buffers then becomes:

$$M_{FBA} = Y_F * Z_F \quad \text{(Eq. 7)}$$

where:
 $M_{FBA}$ is the minimum memory required for the buffers for the pipeline with a frame based approach, in bytes
 $Y_F$ is the minimum number of frame buffers required to process the pipeline
 $Z_F$ is the size of each frame buffer, in bytes The block-based system offers significant advantages in terms of the memory footprint of the pipeline. Because a block is smaller than a frame, the memory saving can be substantial for even a short length pipe. Following the earlier logic, the minimum number of buffers needed in a block-based system may be min (P, N) block buffers, plus at least 2 frame buffers, again for the I/O operation. As above:

$$Y_B = \min(P, N) \quad \text{(Eq. 8)}$$

where:
 $Y_B$ is the minimum number of block buffers required to process the pipeline
 P is the number of processor elements (SPUs 104) available
 N is the number of stages in the pipeline However, the actual memory requirement for all of the buffers would be:

$$M_{BBA} = Y_B * Z_B + 2 * Z_F \quad \text{(Eq. 9)}$$

where:
 $M_{BBA}$ is the minimum memory required for the buffers for the pipeline with a block based approach, in bytes.
 $Y_B$ is the minimum number of block buffers required to process the pipeline.
 $Z_B$ is the size of each block 304 buffer, in bytes.
 $Z_F$ is the size of each frame 302 buffer, in bytes.

By example, in a 6-stage pipeline on a 4 SPU system where the memory required to hold one frame 302 is 8192 KB (size required to hold a 4-byte per pixel HD frame of dimensions 2048×1024), and each frame 302 is divided into blocks 304 of dimensions 256×256, the size required to hold each block 304 will be 256 KB, and there will be 32 blocks 304 per frame 302 (edge size=0 for simplicity).

Using the formulas for the traditional frame-based approach, the minimum memory required for buffers in a frame-based pipeline system will be:

$$M_{FBA} = [\min(P, N) + 2] * ZF = [\min(4, 6) + 2] * 8192 = 6 * 8192 = 49152 \text{ KB}$$

By comparison, the minimum memory required for processing the same pipeline using a block based approach will be:

$$M_{BBA} = [\min(P, N)] * ZB + 2 * ZF = [\min(4, 6)] * 256 + 2 * 8192 = 4 * 256 + 2 * 8192 = 17408 \text{ KB}.$$

Furthermore, it can be noted that the two mandatory frame buffers consume 16 MB of the 17 MB used in the block-based system. Therefore, by removing these mandatory buffers, the difference in comparable memory usage becomes 32 MB for the frame-based system versus 1.5 MB for the block-based system. Even if the block-based approach were to require significantly more memory for successive area effects, the memory consumption is unlikely to approach that of the frame-based system.

III. Load Balancing

The example embodiments illustrated thus far assume that all of the constituent effects take up the same amount of time to process the same amount of data (be it a frame 302 or a block 304). However, effects may take varying amounts of time, based both on their algorithmic and implementation complexity. The varying processing times of the different effects may degrade the pipeline latency, with the slowest effect causing a bottleneck. The bottleneck may then starve downstream SPUs 104 of work. If the number of buffers is limited, this may also starve upstream SPUs 104 as memory is consumed.

FIG. 10A illustrates an example of a pipeline where the individual computation times for the effects vary significantly. In FIG. 10A, effects FX1, FX2, and FX4 require 20 ms of computation time, effect FX3 requires 160 ms of computation time, and effects FX5 and FX6 require 10 ms of computation time. In this embodiment, since the various blocks enter the pipeline at effect FX1 and consecutively pass through each of effect FX2-FX6, a bottleneck develops at effect FX3.

The processing pipeline in FIG. 10A is similar to the embodiment discussed with respect to FIGS. 8 and 9 where each SPU 104 is assigned a single effect. However, whereas in FIGS. 8 and 9 the block latency was 6 blocks, in FIG. 10, the total pipeline latency is significantly higher, due to the bottleneck created in effect 3. This causes the downstream effects (and hence the other SPUs 104) to waste time in an idle state. Long-term, this bottleneck may end up using a very large number of buffers just to keep the upstream SPUs 104 occupied, without any benefit at the output end.

Static Load Balancing offers a first solution to this problem. Static Load Balancing includes performing a static analysis of the effects, by taking into account the computation times of the various effects (FX1-FX6) involved. This allows for prior distribution of the effects which can include combining short computation effects into a single resource (i.e., one or a few SPU), while increasing the number of resources (e.g., dedicating a plurality of SPUs) to the slower effects.

FIG. 10B illustrates an example of load balanced effect pipeline. The effect processing times in FIG. 10B are identical to FIG. 10A; however the effects are load balanced between the different SPUs 104 (104-1 to 104-6). In FIG. 11B, SPUs 104-2 to 104-5 are dedicated to effect FX3. SPU 104-1 is assigned effects FX1 and FX2, while SPU 104-6 is assigned effect FX4, FX5, and FX6. This distribution utilizes all of the SPUs 104, while still limiting our buffer usage and speeding up overall performance. Particularly evident, is the fact that the excessive processing time consumed by effect FX3 is distributed across multiple SPUs 104 (104-2 to 104-5). This ensures that, as each block 304 exits effect FX2, there is an available SPU 104 to process effect FX3. Furthermore, as each block 304 exits effect FX3, the SPU 104 assigned effect FX4 to FX6, is immediately available.

Static Load Balancing can work well for fixed function pipeline, but fails to scale well with the needs of a generic effect pipeline, or even a fixed function pipeline where the effect processing times vary based on either the complexity of the input data, or external parameters.

Dynamic Load Balancing offers an alternative to static load balancing in cases where processing load varies from one frame to the next or one block to the next, either based on external input (such as an effect whose processing time changes with the parameters provided by the user), or based on the work load itself (such as a decoder, based on compression variation within the encoded data).

Switching to block-based processing from frame-based processing allows for more effective dynamic load balancing in a scheduling system, as there are more synchronization points available to the scheduler to balance things out, and localized work differences can be taken into account (e.g. blocks within the same frame containing low contrast data and blocks containing high contrast data will have different performance characteristics for different effects, and switching to block-based dynamic load balancing allows the system to adapt to this at a more fine-grained level).

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. Processes may also be implemented as computer-executable instructions (e.g., as one or more scripts), stored procedures, executable programs, etc. on a client, server, and/or database. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but instead with reference to the appended claims, along with the full scope of equivalents to which such claims are entitled. It is anticipated and intended that future developments will occur in the arts discussed herein, and that the mentioned systems and methods will be incorporated into such future embodiments. In sum, it should be understood that the invention is capable of modification and variation and is limited only by the following claims.

The disclosed parallel processing methods can be applied to audio effects pipelines, 3D effects pipelines, or any situation where data can be broken down into separate blocks and processed through a pipeline of effects.

Computing devices (e.g., processors, clients, servers, terminals, etc.), such as those discussed herein generally may include executable instructions. Furthermore, processors may include any device itself containing any number of processing components, such as SPU, PPUs, GPUs, etc. Computer-executable instructions may be compiled or interpreted from computer programs created using a variety of programming languages and/or technologies known to those skilled in the art, including, without limitation, and either alone or in combination, Java™, C, C++, assembly, etc. In general, a processor (e.g., a microprocessor), receives instructions (e.g., from a memory, a computer-readable medium, etc.), and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory.

Communications between computing devices, and within computing devices may employ transmission media including coaxial cables, copper wire, and fiber optics, including the wires that comprise a system bus coupled to the processor. Transmission media may include or convey acoustic waves, light waves, and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Thus, embodiments of the present invention produce and provide a pipelined image processing engine. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A method for processing image frames through a pipeline of effects, the method comprising:
   generating a plurality of blocks, each block containing a group of primary pixels and a group of total pixels, the total pixels including any pixels required as input by an effect, from the pipeline of effects, to produce output for the primary pixels, wherein the number of pixels in the group of primary pixels is less than the number of pixels in the group of total pixels;
   processing each block through the pipeline of effects in a predefined consecutive order, the pipeline of effects being distributed over a plurality of processing nodes, including updating the total pixels in a block with primary pixels from at least one neighboring block after processing a first effect and before processing a second effect; and
   aggregating the processed blocks to produce an output frame by combining the primary pixels from the processed blocks;
   wherein each effect, from the pipeline of effects, processes a block, provided as input to the node, to produce output for the primary pixels of the block.

2. The method of claim 1, wherein the total block pixels include the primary pixels and any additional pixels required as input by at least one effect to produce output for the primary pixels.

3. The method of claim 1, wherein generating the plurality of blocks further includes analyzing an effect to determine the total pixels required to generate the output for the primary pixels.

4. The method of claim 3, wherein generating a plurality of blocks includes:
   analyzing a first effect to determine the total pixels required to produce output for the primary pixels; and
   analyzing a second effect to determine the total pixels required to generate output for the total pixels required by the first effect to produce output for the primary pixels.

5. The method of claim 4, wherein the processing step reduces the number of total pixels in a block after processing the block through the second effect and before processing the first effect.

6. The method of claim 1, wherein the total pixels includes any pixels required as input to serially process a block through a plurality of effects, from the pipeline of effects, to produce output for the primary pixels.

7. The method of claim 1, wherein generating a plurality of blocks includes analyzing each effect to determine if the effect is a pixel effect, an area effect, or a range effect.

8. The method of claim 1, wherein generating a plurality of blocks includes analyzing the resources available to a node and an effect to determine the number of primary pixels and total pixels for each block from the plurality of blocks.

9. The method of claim 1, wherein the total pixels includes a plurality of pixels from temporally neighboring image frames.

10. The method of claim 1, wherein the total pixels includes a plurality of spatially neighboring pixels within the input image frame.

11. The method of claim 1, wherein when processing each block through the pipeline of effects, each processing node independently processes a block using an effect.

12. The method of claim 1, wherein the processing step includes scheduling the effects to reduce latency between the beginning processing of first block in each frame and the output of the last block in each frame.

13. An apparatus for processing a chain of image frames through an effects pipeline, comprising:
   a primary processor including a block generator, effect distributor, and block aggregator;
   a plurality of secondary processors, each including a minimum memory cache to store the contents of a block; and
   a bus interconnecting the primary processor, the plurality of secondary processors, and a memory interface;
   wherein
   the block generator generates a plurality of blocks from an input image frame provided through the memory interface, each block containing a group of primary pixels and a group of total pixels from the input image frame, the total pixels including any pixels required as input by an effect, from the pipeline of effects, to produce output for the primary pixels, wherein the number of pixels in the group of primary pixels is less than the number of pixels in the group of total pixels,
   the effect distributor manages the distribution and processing order of the effects and the plurality of blocks among the plurality of secondary processors,
   the block aggregator combines the processed blocks;
   the plurality of secondary processors process each block through the pipeline of effects in a consecutive order, the pipeline of effects being distributed over the plurality of secondary processors, and
   each secondary processor executes an effect which processes each block independently to produce output for the primary pixels for that block;
   wherein the second processors update the total pixels of a block with primary pixels from at least one neighboring block after processing a first effect and before processing a second effect to the block.

14. The apparatus of claim 13, wherein the total pixels, in each block, includes the primary pixels and any additional pixels required as input by at least one effect to output the primary pixels.

15. The apparatus of claim 13, wherein the primary processor analyzes an effect to determine the total pixels required to generate the primary pixels.

16. The apparatus of claim 13, wherein the block generator analyzes a first effect to determine the total pixels required to generate the primary pixels and analyzes a second effect to determine the total pixels required to generate the total pixels required by the first effect to generate the primary pixels.

17. The apparatus of claim 16, wherein a secondary processor reduces the number of total pixels in a block after processing the block through the second effect and before processing the first effect.

18. The apparatus of claim 13, wherein the total pixels includes any pixel required as input to serially process a block by at least one secondary processor executing at least one effect from the pipeline of effects to produce output for the primary pixels.

19. The apparatus of claim 13, wherein the block generator analyzes each effect to determine if the at least one effect is a pixel effect, an area effect, or a range effect.

20. The apparatus of claim 13, wherein generating a plurality of blocks includes analyzing the resources available to a secondary processor and a corresponding effect to determine the number of primary pixels and total pixels.

21. The apparatus of claim 13, wherein the total pixels include a plurality of pixels from temporally neighboring image frames.

22. The apparatus of claim 13, wherein the total pixels include pixels from a plurality of primary pixels from spatially neighboring blocks.

23. The apparatus of claim 13, wherein when processing each block through the pipeline of effects, each secondary processor independently processes a block using an effect.

24. The apparatus of claim 13, wherein the primary processor includes a scheduler to reduce latency between the beginning processing of a first block in each frame and the output of a last block in each frame.

* * * * *